(12) United States Patent
Chin

(10) Patent No.: US 9,203,945 B2
(45) Date of Patent: Dec. 1, 2015

(54) TABLET COMPUTER PROTECTIVE CASE WITH KEYBOARD

(71) Applicant: Solid Year Co., Ltd, Changhua Hsien (TW)

(72) Inventor: Chung-Yi Chin, Changhua Hsien (TW)

(73) Assignee: SOLID YEAR CO., LTD., Changhua Hsien (TW)

( * ) Notice: Subject to any disclaimer, the term of this patent is extended or adjusted under 35 U.S.C. 154(b) by 57 days.

(21) Appl. No.: 14/299,090

(22) Filed: Jun. 9, 2014

(65) Prior Publication Data

US 2015/0296068 A1 Oct. 15, 2015

(30) Foreign Application Priority Data

Apr. 15, 2014 (TW) .............................. 103206512 U

(51) Int. Cl.
| | |
|---|---|
| *B65D 85/00* | (2006.01) |
| *H04M 1/725* | (2006.01) |
| *A45C 11/00* | (2006.01) |
| *A45C 13/00* | (2006.01) |
| *H04M 1/02* | (2006.01) |

(52) U.S. Cl.
CPC ........... *H04M 1/72519* (2013.01); *A45C 11/00* (2013.01); *A45C 13/002* (2013.01); *H04M 1/026* (2013.01); *A45C 2011/003* (2013.01)

(58) Field of Classification Search
CPC .... H04M 1/72519; H04M 1/26; A45C 11/00; A45C 13/002; A45C 2011/003
USPC ......................................................... 206/320
See application file for complete search history.

(56) References Cited

U.S. PATENT DOCUMENTS

| | | | | |
|---|---|---|---|---|
| 8,607,976 B2 * | 12/2013 | Wu | ........................ | G06F 1/1626 |
| | | | | 206/320 |
| 8,727,116 B2 * | 5/2014 | Kim | ........................ | A45C 3/001 |
| | | | | 206/320 |

* cited by examiner

*Primary Examiner* — Anthony Stashick
*Assistant Examiner* — James M Van Buskirk
(74) *Attorney, Agent, or Firm* — Jackson IPG PLLC; Demian K. Jackson

(57) ABSTRACT

A tablet computer protective case with a keyboard includes an outer cover, an inner cover, a zipper, a partition, and two elastic members. When in use, the protective case is placed on a support plane and the zipper is unzipped to open the inner and outer covers. The keyboard is placed in an inner bottom concave cover of the inner cover, and the tablet computer is placed in an inner top concave cover of the inner cover. After that, a third upper support portion of the inner top concave cover of the inner cover is folded outward relative to a third lower support portion. The first upper support portion of the outer top concave cover of the outer cover is also folded outward relative to a first lower support portion. A second upper support portion of the partition is folded outward relative to a second lower support portion. One side of the outer top concave cover of the outer cover, away from the outer bottom concave cover, leans against the support plane and is supported by the two elastic members, so that the tablet computer and the keyboard form an obtuse angle for the user to use the keyboard and the tablet computer conveniently.

6 Claims, 9 Drawing Sheets

TABLET COMPUTER PROTECTIVE CASE WITH KEYBOARD

BACKGROUND OF THE INVENTION

1. Field of the Invention

The present invention relates to a protective case, and more particularly to a tablet computer protective case with a keyboard.

2. Description of the Prior Art

These days, a tablet computer is a popular electronic product. Compared to a notebook computer, more and more people purchase portable tablet computers because the tablet computers are extremely portable. However, the tablet computer still has some shortcomings. For example, the speed to input words in a touch way is slower.

For the tablet computer, the way to input words can be done through handwriting on a touch screen or through a virtual keyboard. Subject to the speed, the input of a few words can be completed by this way. If there are a lot of words to be inputted, this way is not appropriate. Therefore, a wireless real keyboard to cooperate with the tablet computer is developed on the market for the user to input a lot of words conveniently.

The tablet computer and the keyboard don't have a real connecting configuration. In general, they are separate for storage and carrying. This is inconvenient for use. Besides, the appearances of the tablet computer and the keyboard may be scraped and damaged easily.

Therefore, in order to improve the aforesaid shortcomings, a tablet computer protective case is developed, referring to Taiwanese Utility Model No. M456522. The tablet computer protective case comprises a keyboard portion, a receiving portion, and an upper buckle board. The receiving portion is pivotally connected to the keyboard portion and can be turned relative to the keyboard portion. The receiving portion has an accommodation area to accommodate a tablet computer. The upper buckle board is pivotally connected to the receiving portion, so that the upper buckle portion can be turned relative to the receiving portion. Two corners of the upper buckle board are provided with corner buckles. When the table computer is placed in the accommodation area, the upper buckle board is turned to lean against the tablet computer with the corner buckles to wrap the corresponding corners of the tablet computer.

However, when the tablet computer is placed in the receiving portion for use, the receiving portion and the keyboard portion form an obtuse angle. If the tablet computer and the force applied to the keyboard cannot keep a balance, the receiving portion with the tablet computer will topple, without a support. When in use, the user has to press the keyboard portion with his/her hands. It is very inconvenient for operation. The design of the receiving portion is not applicable to the demands of different consumers, so it can't be used widely. Accordingly, the inventor of the present invention has devoted himself based on his many years of practical experiences to solve these problems.

SUMMARY OF THE INVENTION

The primary object of the present invention is to provide a tablet computer protective case with a keyboard. The protective case of the present invention is convenient for use and has a simple structure. Because its inner and outer covers are made of a cloth material, the protective case may have different designs as desired to be used widely.

In order to achieve the aforesaid object, the tablet computer protective case of the present invention comprises an outer cover, an inner cover, a zipper, a partition, and two elastic members. The outer cover has an outer bottom concave cover and an outer top concave cover. One side of the outer bottom concave cover is connected with one side of the outer top concave cover. The outer top concave cover is foldable relative to the outer bottom concave cover. The outer top concave cover has a first lower support portion and a first upper support portion. The joint portion of the first lower support portion and the first upper support portion is substantially parallel to the joint portion of the outer bottom concave cover and the outer top concave cover. The first upper support portion can be folded outward relative to the first lower support portion. The first lower support portion has two first lower through holes which are transversely spaced. The first upper support portion has two first upper through holes which are transversely spaced. The first upper through holes correspond in position to the first lower through holes. The inner cover has an inner bottom concave cover and an inner top concave cover. The inner bottom concave cover is disposed in the outer bottom concave cover. The inner top concave cover is disposed in the outer top concave cover. One side of the inner bottom concave cover is separate from and disposed close to one side of the inner top concave cover. The inner top concave cover has a third lower support portion and a third upper support portion. The third lower support portion and the third upper support portion correspond to the first lower support portion and the first upper support portion, respectively. The joint portion of the third lower support portion and the third upper support portion is substantially parallel to the joint portion of the inner bottom concave cover and the inner top concave cover. The third upper support portion can be folded outward relative to the third lower support portion. The zipper is sewed between the outer cover and the inner cover to connect the outer cover and the inner cover. Through the zipper, the inner bottom concave cover and the inner top concave cover of the inner cover can be opened or closed. The partition is disposed between the outer top concave cover and the inner top concave cover. The partition has a second lower support portion and a second upper support portion. The second lower support portion and the second upper support portion correspond to the first lower support portion and the first upper support portion, respectively. The joint portion of the second lower support portion and the second upper support portion is substantially parallel to the joint portion of the outer bottom concave cover and the outer top concave cover. The second upper support portion can be folded outward relative to the second lower support portion. The second lower support portion has two second lower through holes which are transversely spaced. The second upper support portion has two second upper through holes which are transversely spaced. The second lower through holes correspond in position to the first lower through holes. The second upper through holes correspond in position to the first upper through holes. Each elastic member has a first end, a second end, and a body portion connected between the first end and the second end. The first ends of the two elastic members are fixed to the second lower through holes and located between the inner cover and the partition. The second ends of the two elastic members are fixed to the second upper through holes and located between the inner cover and the partition. The body portions of the two elastic members are inserted through the second lower through holes, the first lower through holes, the first upper through holes, and the second upper through holes in sequence.

When the user wants to use the tablet computer, the protective case of the present invention is placed on a support plane and the zipper is unzipped to open the inner cover and the outer cover. The keyboard is placed in the inner bottom concave cover, and the tablet computer is placed in the inner top concave cover of the inner cover and held by the limit portion. After that, the third upper support portion of the inner top concave cover of the inner cover is folded outward relative to the third lower support portion. The first upper support portion of the outer top concave cover of the outer cover is also folded outward relative to the first lower support portion. The second upper support portion of the partition is folded outward relative to the second lower support portion. The side of the outer top concave cover of the outer cover, away from the outer bottom concave cover, leans against the support plane and is supported by the two elastic members. The two elastic members are to support the first upper support portion of the outer cover and the second upper support portion of the partition, with the second lower support portion of the partition and the first lower support portion of the outer top concave cover of the outer cover as the support pint. Meanwhile, the side of the outer top concave cover of the outer cover, away from the outer bottom concave cover, leans against the support plane to achieve a balance. The first lower support portion and the first upper support portion of the outer top concave cover of the outer cover and the support plane form a triangle, so that the tablet computer and the keyboard form an obtuse angle for the user to watch the tablet computer while he/she uses the keyboard.

DETAILED DESCRIPTION OF THE PREFERRED EMBODIMENTS

Embodiments of the present invention will now be described, by way of example only, with reference to the accompanying drawings.

Figure 1:
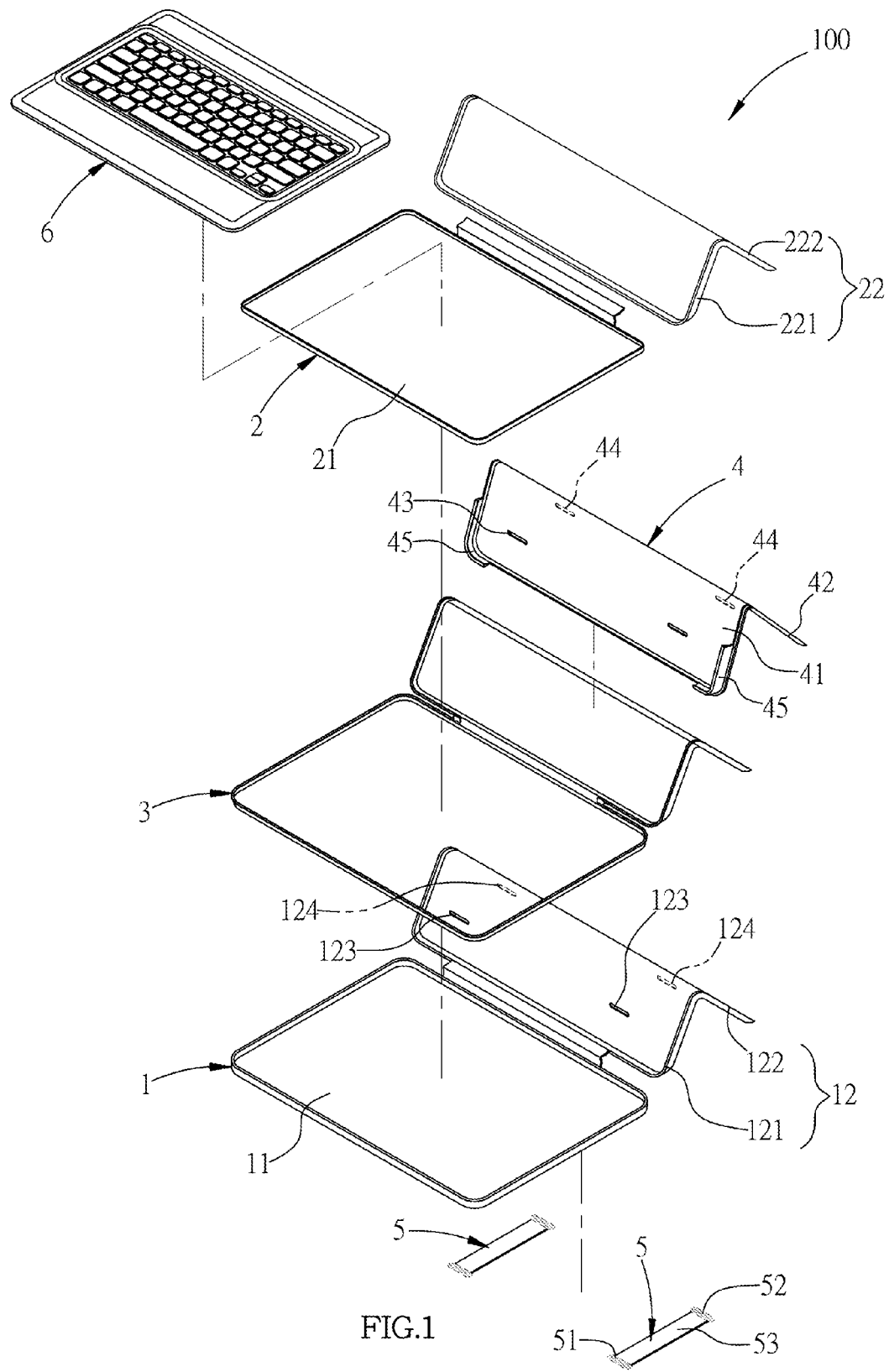
FIG. 1 is an exploded view according to a preferred embodiment of the present invention.
Figure 2:
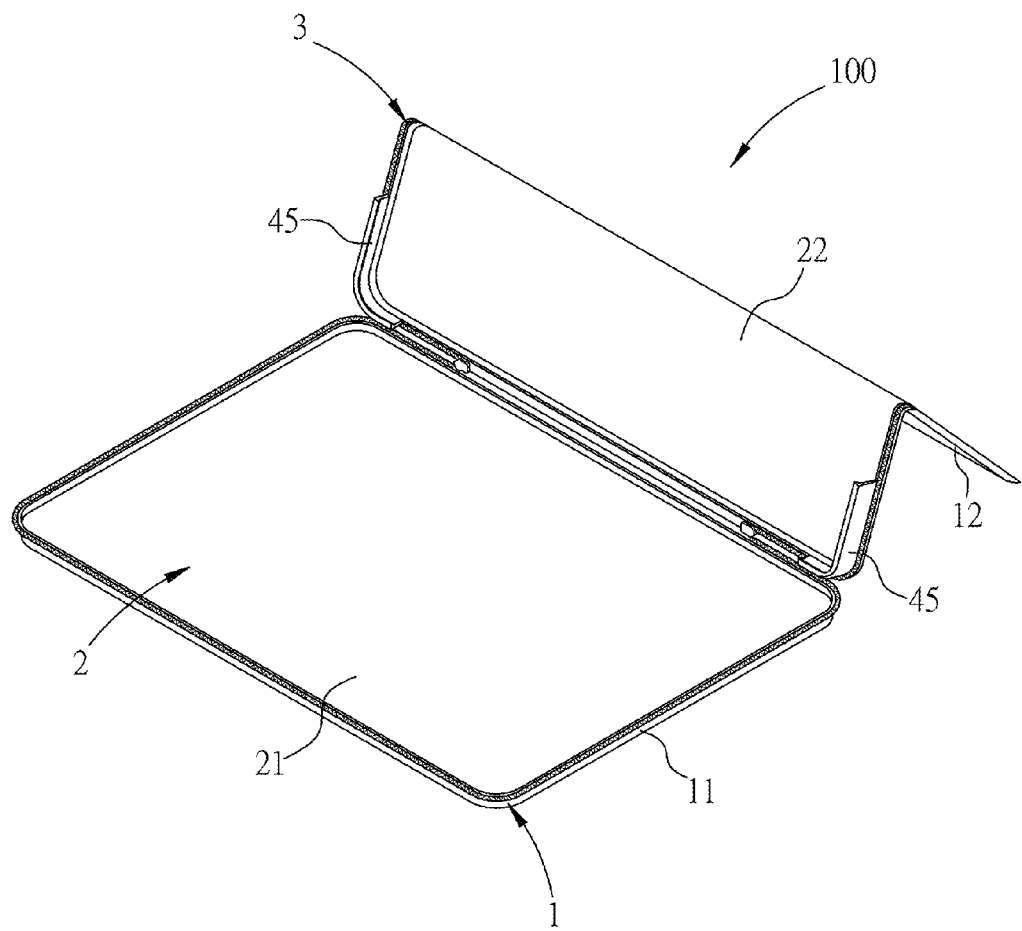
FIG. 2 is a schematic view of the preferred embodiment of the present invention in an open and folded state.
Figure 3:
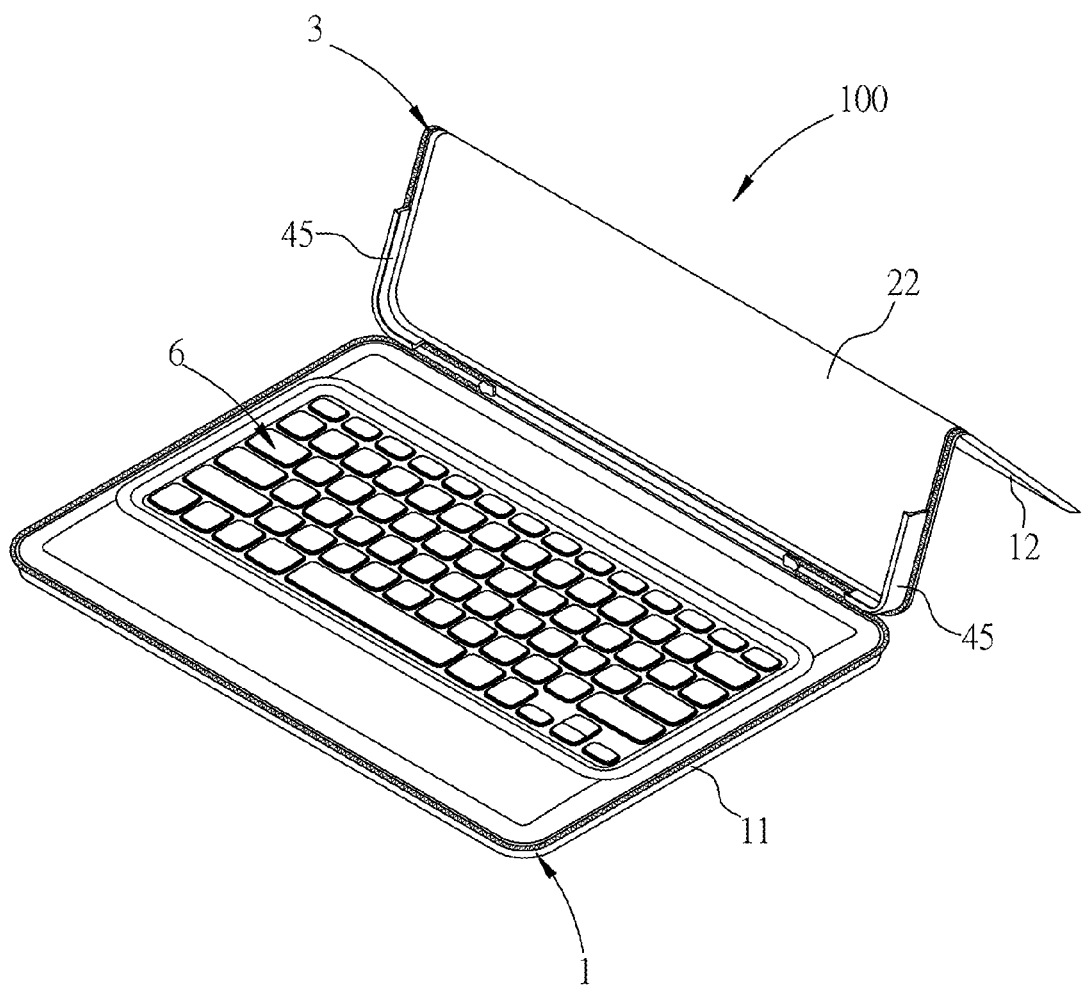
FIG. 3 is a schematic view of FIG. 2 provided with a keyboard.
Figure 4:
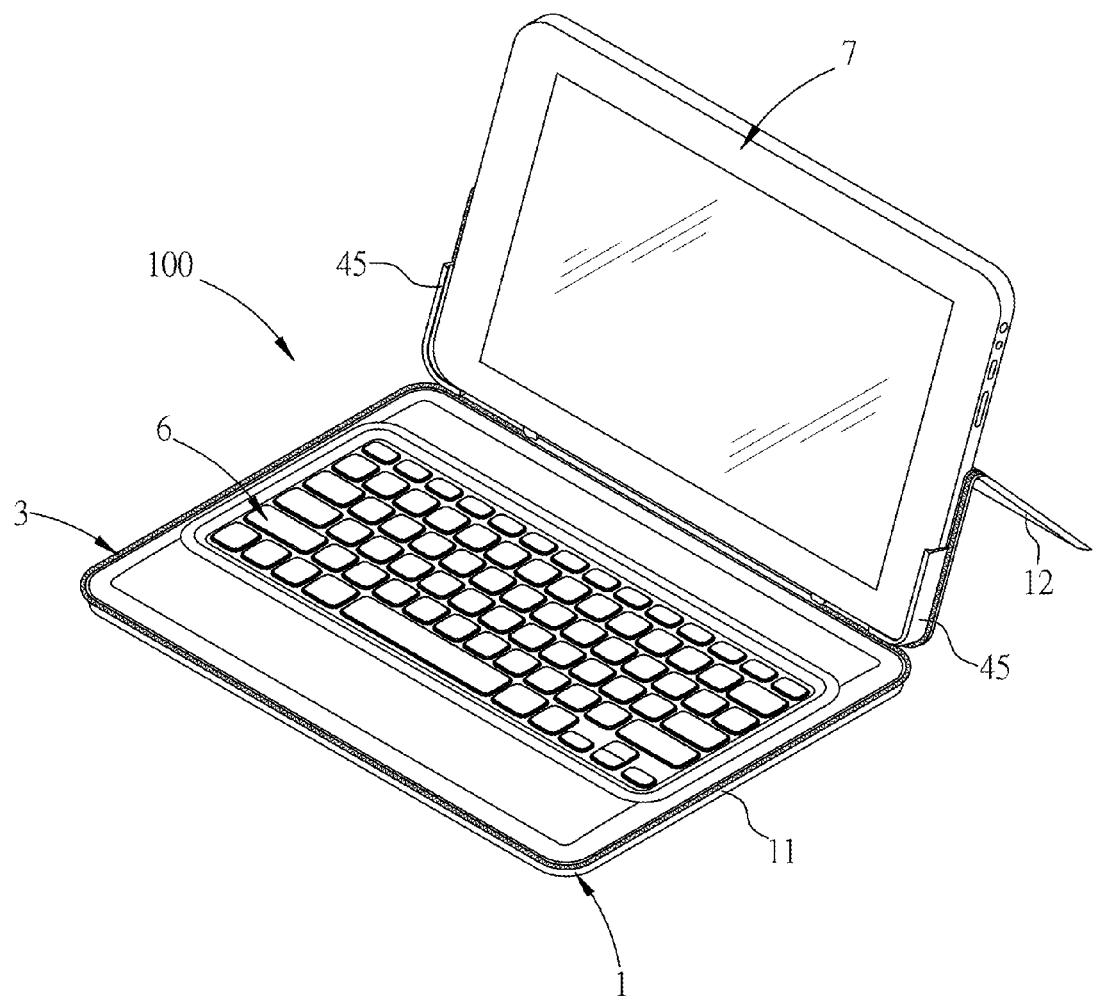
FIG. 4 is a schematic view of FIG. 3 provided with a tablet computer.
Figure 5:
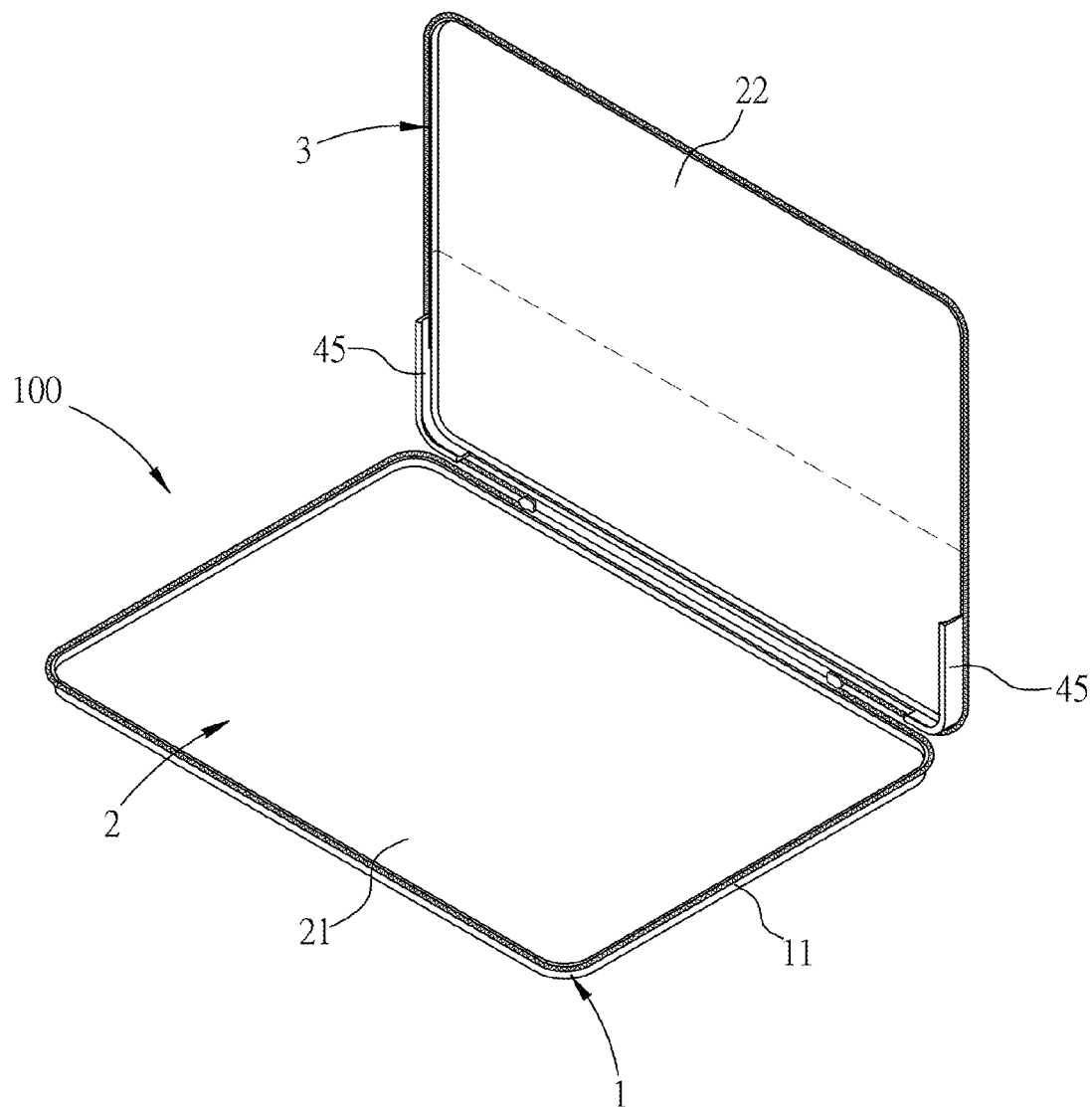
FIG. 5 is a schematic view of the first embodiment of the present invention in an open but not folded state.
Figure 6:
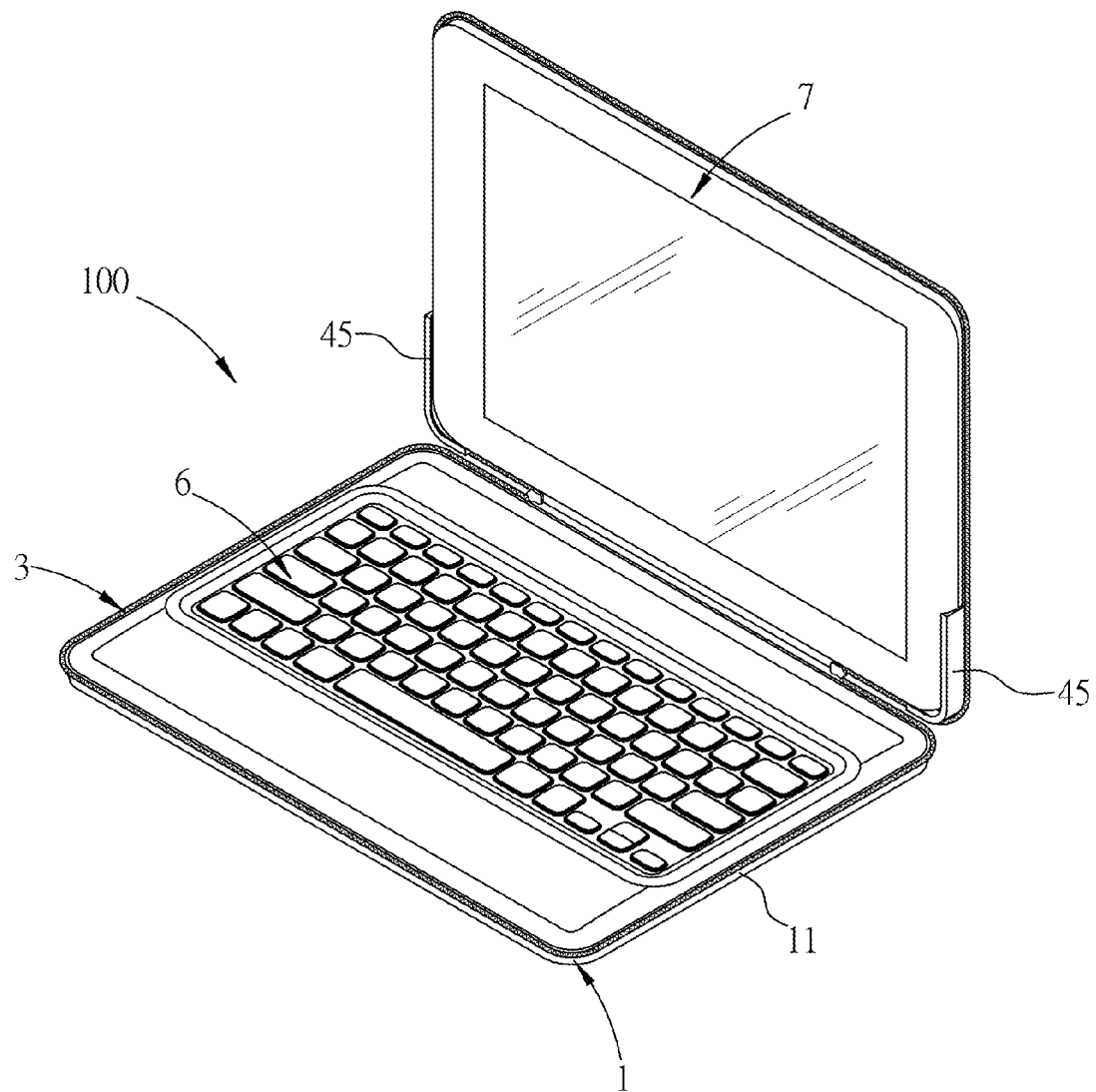
FIG. 6 is a schematic view of FIG. 5 with the tablet computer and the keyboard.
Figure 7:
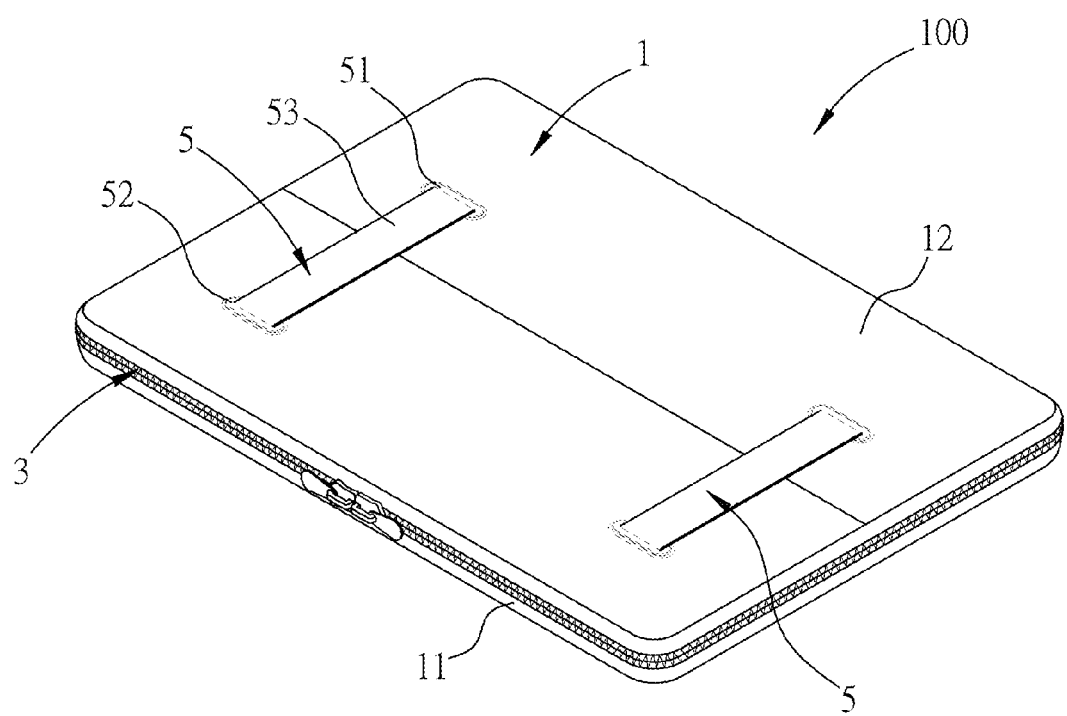
FIG. 7 is a schematic view of FIG. 6 in a closed state.
Figure 8:
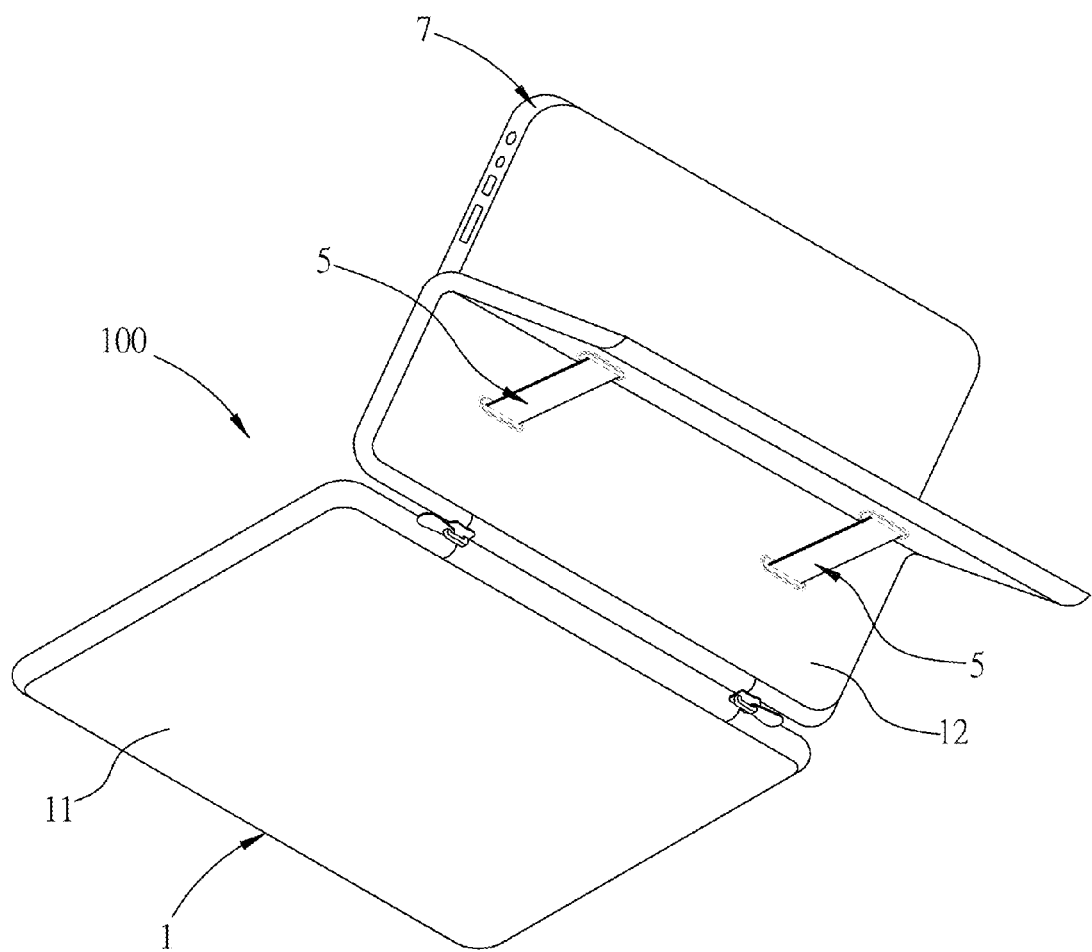
FIG. 8 is another schematic view of FIG. 4.
Figure 9:
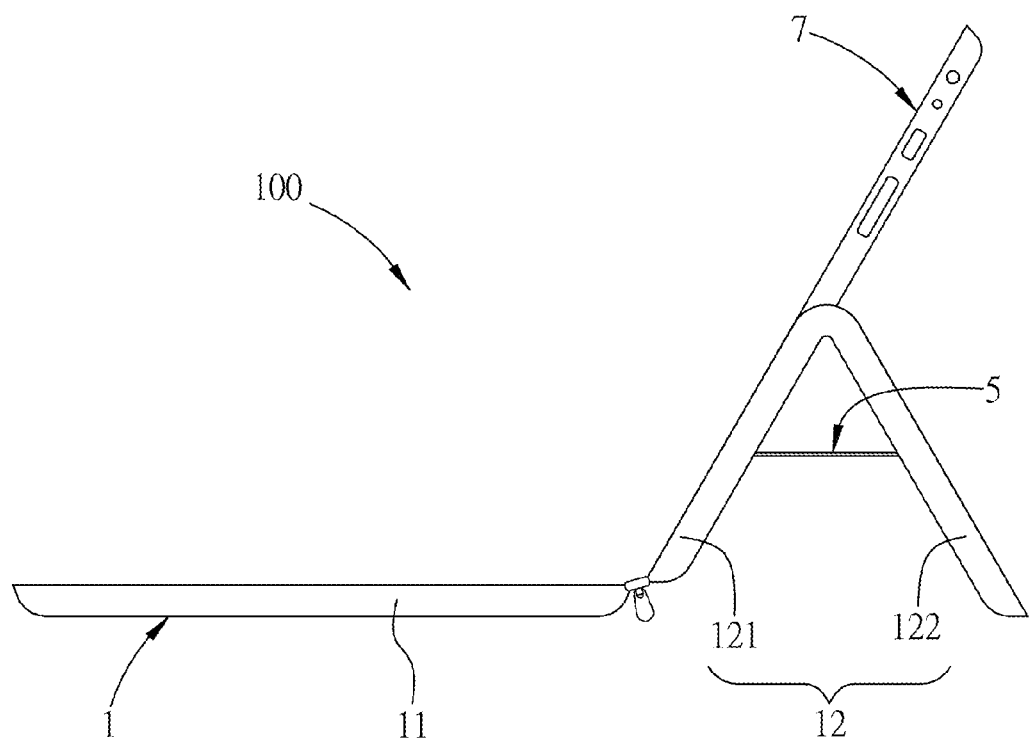
FIG. 9 is a side view of FIG. 8.

FIG. 1 is an exploded view according to a preferred embodiment of the present invention. FIG. 2 is a schematic view of the preferred embodiment of the present invention in an open and folded state. FIG. 3 is a schematic view of FIG. 2 provided with a keyboard. FIG. 4 is a schematic view of FIG. 3 provided with a tablet computer. FIG. 5 is a schematic view of the first embodiment of the present invention in an open but not folded state. FIG. 6 is a schematic view of FIG. 5 with the tablet computer and the keyboard. FIG. 7 is a schematic view of FIG. 6 in a closed state. FIG. 8 is another schematic view of FIG. 4. FIG. 9 is a side view of FIG. 8.

The present invention discloses a tablet computer protective case 100 with a keyboard. The tablet computer protective case 100 comprises an outer cover 1, an inner cover 2, a zipper 3, a partition 4, and two elastic members 5.

The outer cover 1 has an outer bottom concave cover 11 and an outer top concave cover 12. One side of the outer bottom concave cover 11 is connected with one side of the outer top concave cover 12. The outer top concave cover 12 is foldable relative to the outer bottom concave cover 11. The outer top concave cover 12 has a first lower support portion 121 and a first upper support portion 122. The joint portion of the first lower support portion 121 and the first upper support portion 122 is substantially parallel to the joint portion of the outer bottom concave cover 11 and the outer top concave cover 12. The first upper support portion 122 can be folded outward relative to the first lower support portion 121. The first lower support portion 121 has two first lower through holes 123 which are transversely spaced. The first upper support portion 122 has two first upper through holes 124 which are transversely spaced. The first upper through holes 124 correspond in position to the first lower through holes 123.

The inner cover 2 has an inner bottom concave cover 21 and an inner top concave cover 22. The inner bottom concave cover 21 is adapted to accommodate a keyboard 6. The inner bottom concave cover 21 is disposed in the outer bottom concave cover 11. The inner top concave cover 22 is disposed in the outer top concave cover 12. One side of the inner bottom concave cover 21 is separate from and disposed close to one side of the inner top concave cover 22. The inner top concave cover 22 has a third lower support portion 221 and a third upper support portion 222. The third lower support portion 221 and the third upper support portion 222 correspond to the first lower support portion 121 and the first upper support portion 122, respectively. The joint portion of the third lower support portion 221 and the third upper support portion 222 is substantially parallel to the joint portion of the inner bottom concave cover 21 and the inner top concave cover 22. The third upper support portion 222 can be folded outward relative to the third lower support portion 221.

The zipper 3 is sewed between the outer cover 1 and the inner cover 2 to connect the outer cover 1 and the inner cover 2. Through the zipper 3, the inner bottom concave cover 21 and the inner top concave cover 22 of the inner cover 2 can be opened or closed.

The partition 4 is disposed between the outer top concave cover 12 and the inner top concave cover 22. The partition 4 has a second lower support portion 41 and a second upper support portion 42. The second lower support portion 41 and the second upper support portion 42 correspond to the first lower support portion 121 and the first upper support portion 122, respectively. The joint portion of the second lower support portion 41 and the second upper support portion 42 is substantially parallel to the joint portion of the outer bottom concave cover 11 and the outer top concave cover 12. The second upper support portion 42 can be folded outward relative to the second lower support portion 42. The second lower support portion 41 has two second lower through holes 43 which are transversely spaced. The second upper support portion 42 has two second upper through holes 44 which are transversely spaced. The second lower through holes 43 correspond in position to the first lower through holes 123. The second upper through holes 44 correspond in position to the first upper through holes 124.

Furthermore, the partition 4 has a limit portion 45 extending outward from the circumferential portion of the second lower support portion 41 of the partition 4 and located close to one side of the inner bottom concave cover 21. When the tablet computer 7 is placed in the inner top concave cover 22, the limit portion 41 is adapted to hold the tablet computer 7.

Wherein, the outer cover 1 and the inner cover 2 are made of a cloth material. The partition 4 is made of a hard material.

The elastic members 5 are elastic strips. Each elastic member 5 has a first end 51, a second end 52, and a body portion 53 connected between the first end 51 and the second end 52. The first ends 51 of the two elastic members 5 are fixed to the second lower through holes 43 and located between the inner cover 2 and the partition 4. The second ends 52 of the two elastic members 5 are fixed to the second upper through holes 44 and located between the inner cover 2 and the partition 4. The body portions 53 of the two elastic members 5 are inserted through the second lower through holes 43, the first lower through holes 123, the first upper through holes 124, and the second upper through holes 44 in sequence.

When the user wants to use the tablet computer 7, the protective case 100 of the present invention is placed on a support plane (not shown in the drawings) and the zipper 3 is unzipped to open the inner cover 2 and the outer cover 1. The keyboard 6 is placed in the inner bottom concave cover 21, and the tablet computer 7 is placed in the inner top concave cover 22 of the inner cover 2 and held by the limit portion 45. After that, the third upper support portion 222 of the inner top concave cover 22 of the inner cover 2 is folded outward relative to the third lower support portion 221. The first upper support portion 122 of the outer top concave cover 12 of the outer cover 1 is also folded outward relative to the first lower support portion 121. The second upper support portion 42 of the partition 4 is folded outward relative to the second lower support portion 41. The side of the outer top concave cover 12 of the outer cover 1, away from the outer bottom concave cover 11, leans against the support plane and is supported by the two elastic members 5. The two elastic members 5 are to support the first upper support portion 122 of the outer cover 1 and the second upper support portion 42 of the partition 4, with the second lower support portion 41 of the partition 4 and the first lower support portion 121 of the outer top concave cover 12 of the outer cover 1 as the support pint. Meanwhile, the side of the outer top concave cover 12 of the outer cover 1, away from the outer bottom concave cover 11, leans against the support plane to achieve a balance. The first lower support portion 121 and the first upper support portion 122 of the outer top concave cover 12 of the outer cover 1 and the support plane (not shown in the drawings) form a triangle, so that the tablet computer 7 and the keyboard 6 form an obtuse angle for the user to watch the tablet computer 7 while he/she uses the keyboard 6.

The protective case 100 of the present invention is convenient for use and has a simple structure. Because the inner and outer covers are made of a cloth material, the protective case may have different designs as desired to be used widely.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tablet computer protective case with a keyboard, comprising:

an outer cover having an outer bottom concave cover and an outer top concave cover, one side of the outer bottom concave cover being connected with one side of the outer top concave cover, the outer top concave cover being foldable relative to the outer bottom concave cover, the outer top concave cover having a first lower support portion and a first upper support portion, a joint portion of the first lower support portion and the first upper support portion being substantially parallel to a joint portion of the outer bottom concave cover and the outer top concave cover, the first upper support portion being foldable outward relative to the first lower support portion, the first lower support portion having two first lower through holes which are transversely spaced, the first upper support portion having two first upper through holes which are transversely spaced, the first upper through holes corresponding in position to the first lower through holes;

an inner cover having an inner bottom concave cover and an inner top concave cover, the inner bottom concave cover being disposed in the outer bottom concave cover, the inner top concave cover being disposed in the outer top concave cover, one side of the inner bottom concave cover being separate from and disposed close to one side of the inner top concave cover, the inner top concave cover having a third lower support portion and a third upper support portion, the third lower support portion and the third upper support portion respectively corresponding to the first lower support portion and the first upper support portion, a joint portion of the third lower support portion and the third upper support portion being substantially parallel to a joint portion of the inner bottom concave cover and the inner top concave cover, the third upper support portion being foldable outward relative to the third lower support portion;

a zipper sewed between the outer cover and the inner cover to connect the outer cover and the inner cover, wherein the inner bottom concave cover and the inner top concave cover of the inner cover can be opened or closed through the zipper;

a partition disposed between the outer top concave cover and the inner top concave cover, the partition having a second lower support portion and a second upper support portion, the second lower support portion and the second upper support portion respectively corresponding to the first lower support portion and the first upper support portion, a joint portion of the second lower support portion and the second upper support portion being substantially parallel to a joint portion of the outer bottom concave cover and the outer top concave cover, the second upper support portion being foldable outward relative to the second lower support portion, the second lower support portion having two second lower through holes which are transversely spaced, the second upper support portion having two second upper through holes which are transversely spaced, the second lower through holes corresponding in position to the first lower through holes, the second upper through holes corresponding in position to the first upper through holes; and two elastic members each having a first end, a second end, and a body portion connected between the first end and the second end, the first ends of the two elastic members being fixed to the second lower through holes and located between the inner cover and the partition, the second ends of the two elastic members being fixed to the second upper through holes and located between the inner cover and the partition, the body portions of the two elastic members being inserted through the second lower through holes, the first lower through holes, the first upper through holes, and the second upper through holes in sequence.

2. The tablet computer protective case with a keyboard as claimed in claim 1, wherein the outer cover and the inner cover are made of a cloth material.

3. The tablet computer protective case with a keyboard as claimed in claim 2, wherein the partition is made of a hard material.

4. The tablet computer protective case with a keyboard as claimed in claim 1, wherein the inner bottom concave cover of the inner cover is adapted to accommodate the keyboard.

5. The tablet computer protective case with a keyboard as claimed in claim 1, wherein the two elastic members are elastic strips.

6. The tablet computer protective case with a keyboard as claimed in claim 4, wherein the partition has a limit portion extending outward from a circumferential portion of the second lower support portion of the partition and located close to one side of the inner bottom concave cover, wherein when a tablet computer is placed in the inner top concave cover, the limit portion is adapted to hold the tablet computer.

* * * * *